United States Patent
Araki et al.

(10) Patent No.: US 10,684,789 B2
(45) Date of Patent: Jun. 16, 2020

(54) SCHEDULED RECALL IN A HIERARCHICAL SHARED STORAGE SYSTEM

(71) Applicant: International Business Machines Corporation, Armonk, NY (US)

(72) Inventors: Hiroshi Araki, Yokohama (JP); Hiroyuki Miyoshi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 16/009,261

(22) Filed: Jun. 15, 2018

(65) Prior Publication Data
US 2019/0384520 A1 Dec. 19, 2019

(51) Int. Cl.
*G06F 3/06* (2006.01)

(52) U.S. Cl.
CPC .......... *G06F 3/0647* (2013.01); *G06F 3/0611* (2013.01); *G06F 3/0659* (2013.01); *G06F 3/0686* (2013.01)

(58) Field of Classification Search
CPC ........ G06F 3/0647–0649; G06F 3/0355–0661; G06F 3/0686; G06F 13/225; G06F 13/26; G06F 13/30; G06F 13/34
See application file for complete search history.

(56) References Cited

U.S. PATENT DOCUMENTS

| | | | |
|---|---|---|---|
| 5,878,280 A * | 3/1999 | Lucht | G06F 3/061 348/E7.071 |
| 6,272,605 B1 | 8/2001 | Le et al. | |
| 6,279,074 B1 | 8/2001 | Pence | |
| 7,171,525 B1 * | 1/2007 | Norman | G06F 3/0622 711/149 |
| 7,343,446 B2 | 3/2008 | Pudipeddi et al. | |
| 9,880,906 B2 * | 1/2018 | Gold | G06F 3/0611 |
| 2003/0115409 A1 * | 6/2003 | Yamada | G06F 3/0613 711/113 |
| 2006/0020569 A1 * | 1/2006 | Goodman | G06F 3/0608 |
| 2006/0212746 A1 * | 9/2006 | Amegadzie | G06F 16/185 714/6.3 |

(Continued)

OTHER PUBLICATIONS

IBM. IBM Spectrum Protect for Space Management. 2016. IBM. Version 8.1.0. https://www.ibm.com/support/knowledgecenter/SSERBH_8.1.0/hsmul/b_hsm_guide_unx_Inx.pdf. pp. 71-78.*

(Continued)

*Primary Examiner* — Nathan Sadler
(74) *Attorney, Agent, or Firm* — Edward J. Wixted, III (57) ABSTRACT

In a hierarchical storage management system (HSM), a scheduled-recall request is associated with a start-time. Prior to the scheduled-recall request start-time, if a first recall request is directed to the same storage medium as is the scheduled-recall request, the method performs some or all of the scheduled-recall request, with low priority processing, during times that the storage drive (performing the first recall request) is otherwise idle. After the scheduled-recall request start-time, the priority of the scheduled-recall request is increased and data targeted by the scheduled-recall request, that had not already been recalled during the low priority processing, are subsequently processed with high priority.

20 Claims, 7 Drawing Sheets

(56) References Cited

U.S. PATENT DOCUMENTS

2008/0015734 A1\* 1/2008 Wideman .............. G06F 3/0608
                                                        700/214
2008/0216078 A1   9/2008 Miura et al.
2008/0243420 A1\* 10/2008 Gokhale .............. G06F 3/0604
                                                        702/127

OTHER PUBLICATIONS

SNIA. "SNIA Storage Management Initiative Specification." 2007. SNIA. Ver. 1.0.3 rev 1. pp. 27-38.\*

Singer, Eric "Problem Solving: Commvault Tape Usage", Problem Solving:CommVault tape usage: Eric's Blog, Aug. 10, 2016, Last Printed Apr. 24, 2018, 4 pages, <http://www.ericcsinger.com/problem-solving-commvault-tape-usage/>.

IBM et al., "Transparent Optimization of Recalling Migrated Files From Tape", An IP.com Prior Art Database Technical Disclosure, IP.com No. IPCOM000188641D, Electronic Publication Date Oct. 15, 2009, 4 pages. <https://priorart.ip.com/IPCOM/000188641>.

Anonymous, "Processing Priority of Recalls and Deletions", IBM Knowledge Center, Printed Feb. 28, 2018, 2 pages, <https://www.ibm.com/support/knowledgecenter/en/SSLTBW_2.3.0/com.ibm.zos.v2r3.arcf000/proprird.htm>.

Anonymous, "Optimized Tape Recall Processing", IBM Knowledge Center, Printed Feb. 29, 2018, 2 pages, <https://www.ibm.com/support/knowledgecenter/en/SSSR2R_7.1.1/com.ibm.itsm.hsmul.doc/c_recall_optimized_tape.html>.

\* cited by examiner

SCHEDULED RECALL IN A HIERARCHICAL SHARED STORAGE SYSTEM

BACKGROUND

The present invention relates generally to the field of data recall in a hierarchical storage management system, and more particularly to recalling data objects stored on secondary storage media such as tapes or removable disks.

A hierarchical storage management (HSM) system stores frequently accessed data on a higher tier comprising fast storage devices (for instance, flash or hard disk drives), and migrates less-frequently accessed data to a lower tier comprising slower, lower-cost storage (such as tape cartridges in a tape library), to lessen the total cost of data storage. The HSM system may recall migrated data to a higher tier when access to the data is requested. In an HSM system, data that has been migrated to a lower tier is referred to as having been migrated (or as being in a migrated state). Migrated data that has been brought back up to a higher tier is "recalled" (sometimes referred to as being in a "resident" state).

Tape libraries are often used for storing for vast amounts of data, due to a cost advantage (per unit of storage) provided by tape storage over some other storage types. Some storage systems are shared by a plurality of users and/or teams. In such an environment, multiple users are likely to perform write/read operations on a shared tape storage library system at the same time. In some tape libraries, users may be assigned reserved time-slots. During a reserved time-slot, recall requests associated with the corresponding user are given high priority for processing.

SUMMARY

According to an aspect of the present invention, there is a method, computer program product and/or system, for processing recall requests in a hierarchical storage management system, that performs the following operations (not necessarily in the following order): (i) receiving a first recall request, of a plurality of recall requests, wherein the first recall request is for at least a subset of a plurality of data units to be recalled from a second layer of the hierarchical storage management system to a first layer of the hierarchical storage management system; (ii) assigning a respectively corresponding time-variable recall priority to the first recall request; and (iii) copying, in a sequential manner, from the second layer to the first layer, the plurality of data units respectively corresponding to the plurality of recall requests, based at least in part on the respectively corresponding time-variable recall priorities.

DETAILED DESCRIPTION

Embodiments of the present invention perform the following actions with respect to a data recall request in a hierarchical storage management (HSM) system. A user, or application associated with the user, makes a data recall request in an HSM system. The recall request is placed in a scheduled recall request list (sometimes referred to as a queue). The user is assigned a time-slot during which the user's scheduled recall requests are given high priority. Outside the assigned time-slot, the user's requests are given lower priority. During the low priority time, if a higher priority request happens to be directed to the same storage medium as the user's low priority (scheduled recall) request, some (or all) of the low priority request is processed during idle periods that may occur while processing the higher priority request. Once the user's priority is upgraded to high at the start of the assigned time-slot, any remaining processing for the scheduled recall request is carried out with high priority during the assigned time-slot.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
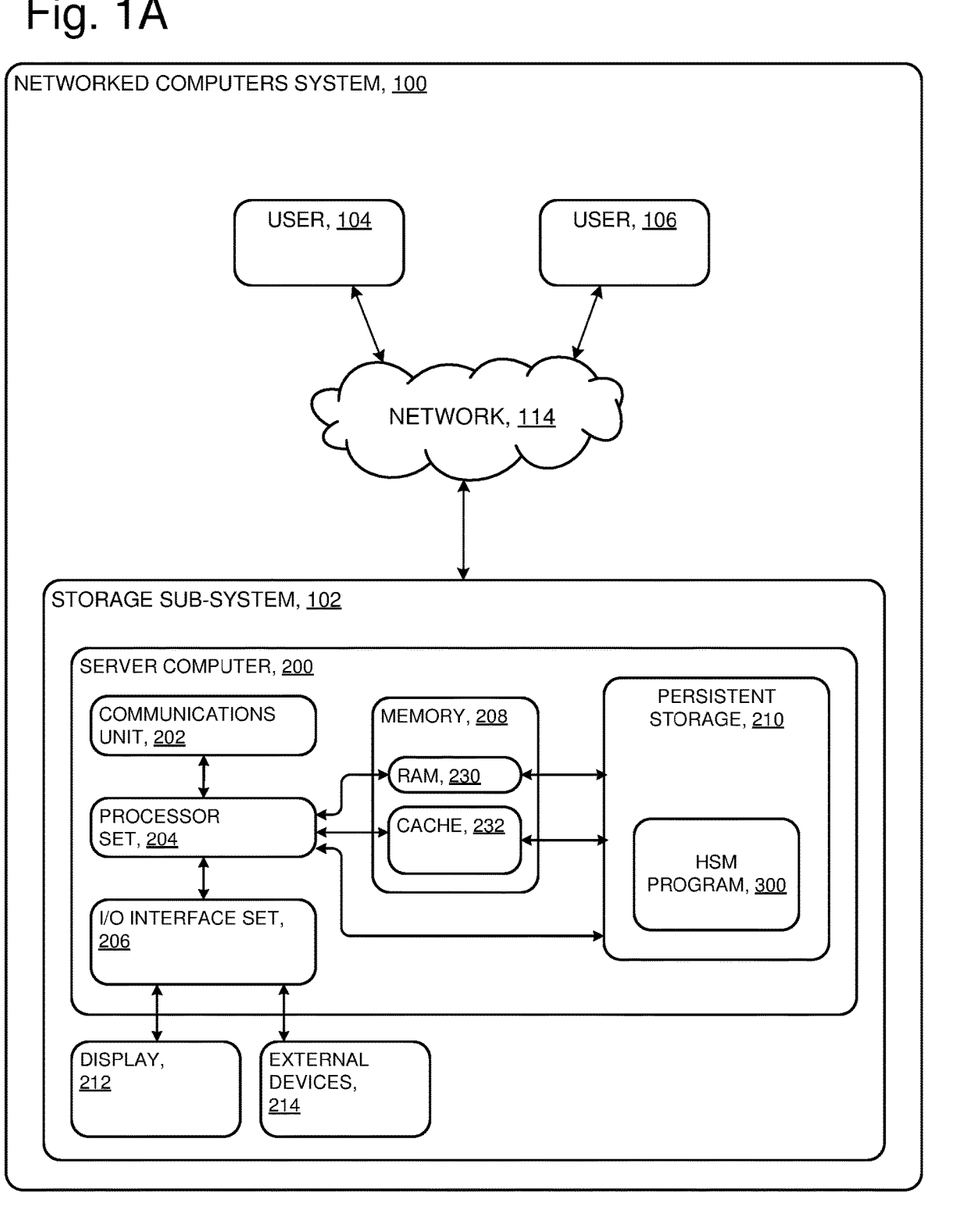
FIG. 1A is a functional block diagram of a computing environment in accordance with at least one embodiment of the present invention.

An embodiment of a possible hardware and software environment for software and/or methods according to the present invention will now be described in detail with reference to the Figures. FIG. 1A is a functional block diagram illustrating various portions of networked computers system 100, including: storage sub-system 102; users 104 and 106; communication network 114; server computer 200; communication unit 202; processor set 204; input/output (I/O) interface set 206; memory device 208; persistent storage device 210; display device 212; external device set 214; random access memory (RAM) devices 230; cache memory device 232; and hierarchical storage management program 300 (HSM program 300).

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. HSM program 300 is a collection of machine readable instructions and/or data that is used to create, manage and control certain software functions that will be discussed in detail, below, in the Example Embodiment sub-section of this Detailed Description section.

Storage sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for storage sub-system 102; and/or (ii) devices external to storage sub-system 102 may be able to provide memory for storage sub-system 102.

HSM program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

HSM program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, HSM program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

Figure 1B:
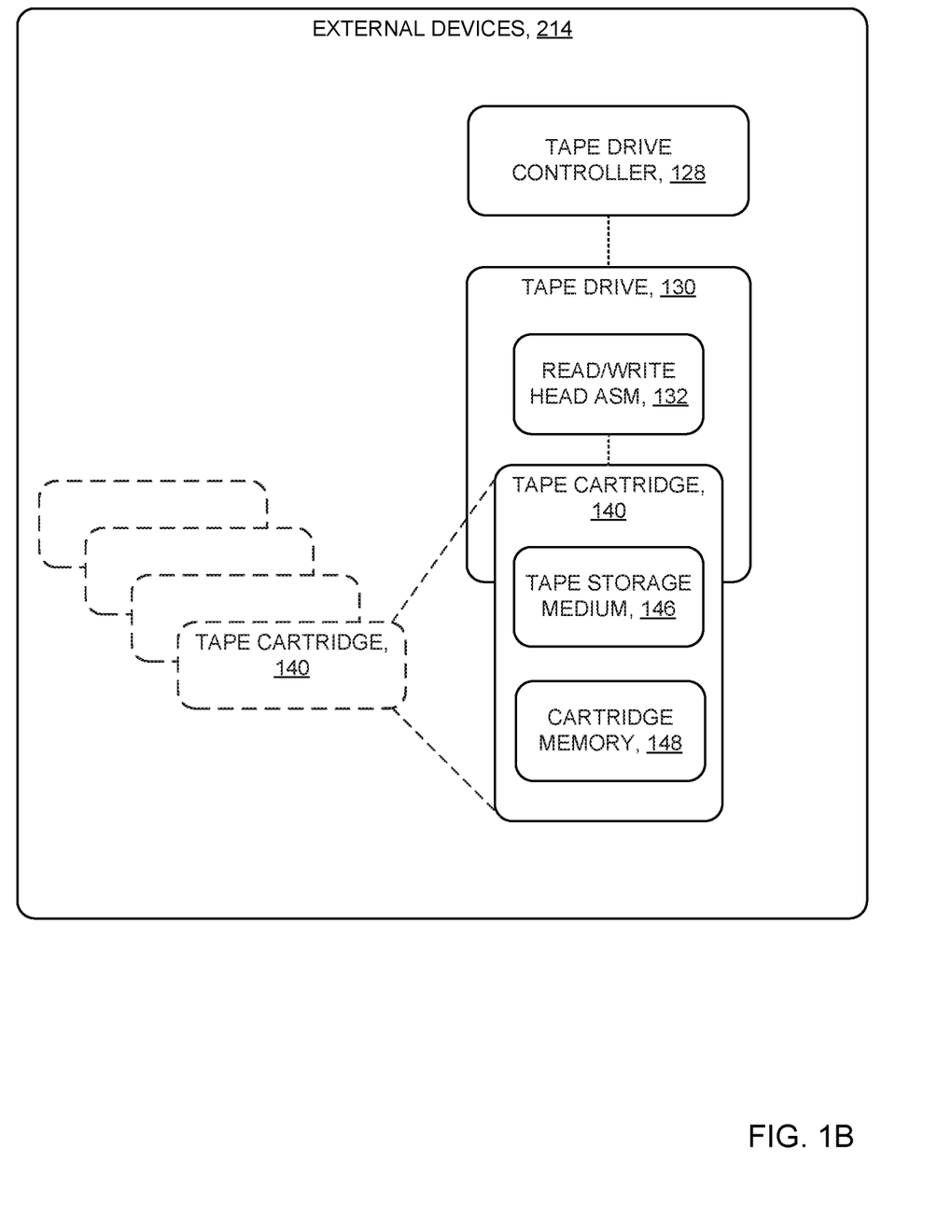
FIG. 1B is a functional block diagram of a tape storage system in accordance with at least one embodiment of the present invention.

FIG. 1B is a functional block diagram of a tape storage system in accordance with some embodiments of the present invention. External devices 214 includes: tape drive controller 128; tape drive 130; read/write head assembly 132; tape cartridge 140; tape storage medium 146; and cartridge memory 148. Tape cartridge 140 is one tape cartridge (of a plurality of tape cartridges) in a storage library. In some embodiments, tape drive controller 128 directs a transport mechanism (not shown) to select a tape cartridge from a rest location, transport the cartridge to tape drive 130 whereupon the tape drive performs read and/or write operations as directed by tape drive controller 128. Once access to tape cartridge 140 is no longer needed, it is unmounted from the drive and returned to its rest location by the transport mechanism.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
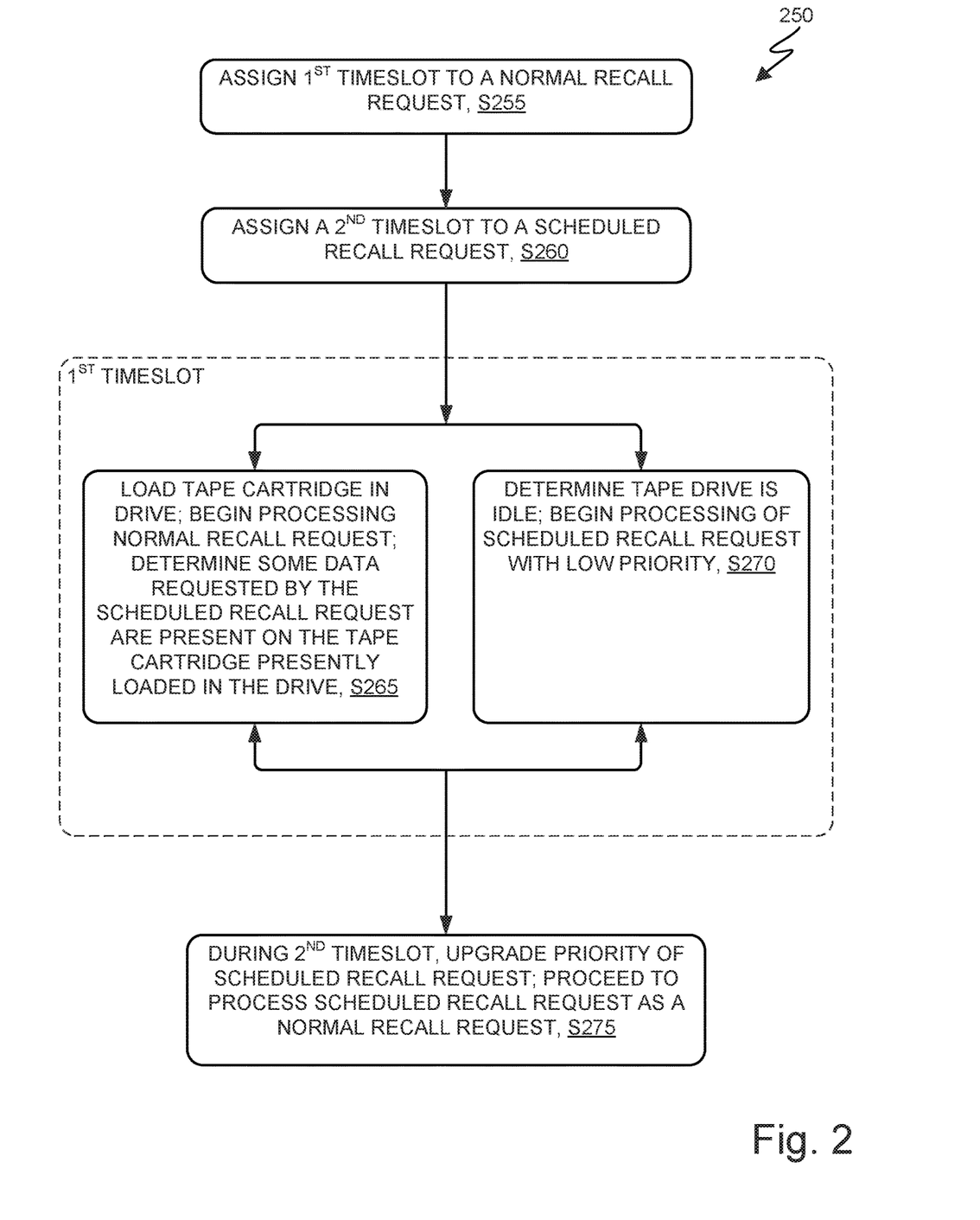
FIG. 2 is a flowchart showing a first embodiment method performed, at least in part, by the first embodiment system.
Figure 3:
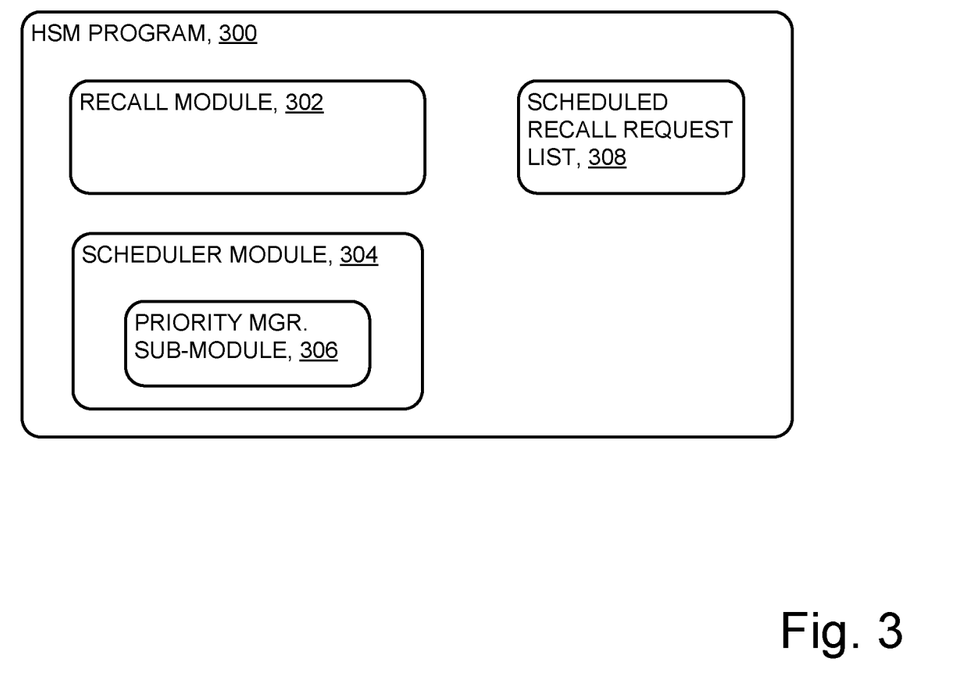
FIG. 3 is a block diagram showing a machine logic (for example, software) portion of the first embodiment system.

FIG. 2 shows flowchart 250 depicting a method according to the present invention. FIG. 3 shows HSM program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where priority manager sub-module 306 of scheduler module 304, of hierarchical storage manager program (HSM program 300), assigns a first time-slot to a first user, for processing of a normal recall request made by the first user, the normal recall request having been received by recall module 302. In an embodiment, at least some data files targeted by the normal recall request are stored on tape storage medium 146 of tape cartridge 140 (see FIG. 1B).

Processing proceeds at operation S260, where priority manager sub-module 306 assigns a second time-slot to a second user, for processing of a scheduled recall request made by the second user, the scheduled recall request having been received by recall module 302. In this embodiment, at least some data files targeted by the scheduled recall request are also stored on tape storage medium 146. Priority manager sub-module 306 generates (or updates an existing) scheduled recall request list 308, to include an entry corresponding to the scheduled recall request.

Processing proceeds at operation S265, where, during the first time-slot (dashed-line rectangle in FIG. 2), recall module 302 begins to process the normal recall request. A transport mechanism (not shown in the Figures) retrieves tape cartridge 140 from a rest position and delivers it to tape drive 130 (see FIG. 3). The normal recall request has priority, during the first time-slot, over other recall requests with respect to tape cartridge 140 and/or with respect to tape drive 130. Once tape cartridge 140 has been mounted in tape drive 130, tape drive controller 128 begins to process the normal recall request.

Further, during the first time-slot, scheduler module 304, determines that some or all of the data files requested by the scheduled recall request are present on tape storage medium 146. In some embodiments, the scheduler module determines this by reference to, at least, scheduled recall request list 308.

Processing proceeds at operation S270, where, still during the first time-slot, HSM program 300 determines that tape drive 130 is in an idle state. In response, scheduler module 304 directs tape drive controller to process at least some of the scheduled recall request during the time when tape drive 130 would otherwise be idle.

Processing at operations S265 and S270, discussed above, may occur multiple times, in any order, during the first time-slot.

Processing proceeds at operation S275, where priority manager sub-module 306, of scheduler module 304, determines that the second time-slot has arrived. In response, priority manager sub-module 306 upgrades the priority assigned to the scheduled recall request to normal priority. Any data units (on tape cartridge 140) remaining to be processed for the scheduled recall request, are processed with normal recall request priority. In other words, the scheduled recall request is processed as if it were a normal recall request, without tape drive resource contention from other recall requests, and without having to re-mount tape cartridge 140 in a drive unit. Data units on tape cartridge 140, remaining to be processed for the scheduled recall request can be recalled without having to remount the tape cartridge, because the tape cartridge has already been mounted in the drive unit for processing the normal recall request. As a result, time needed to un-mount and re-mount the cartridge, when switching between the normal request and the scheduled request, is avoided. Further, because some of the scheduled recall request had been processed during the first time-slot, the time needed to complete the scheduled recall request is reduced, thereby freeing up tape drive 130 for other tasks earlier, and increasing overall performance of HSM program 300.

If a tape drive is available for use during the first time slot, while there is no processing being carried out with respect to the normal request, some embodiments begin processing some, or all of the scheduled recall request. In other words, if the normal request has been completed before expiration of the first time-slot, scheduler module 304 may trigger processing of the scheduled recall request to be carried out, at least in part, during the first time-slot.

It is to be understood that the normal recall request and the scheduled recall request, indeed any recall request, may be directed to data that resides on more than a single tape cartridge. Some embodiments of the present invention apply the same process as described above to each tape cartridge and each tape drive involved in the recall requests. That means if a normal request involves tape cartridges A, B, and C, all three tape cartridges may be mounted in three drives (X, Y, and Z respectively), at the same time, overlapping times, or separate times. Priority management of the normal recall request with respect to a scheduled recall request is the same for each cartridge and drive combination as described above with respect to the normal and scheduled recall requests discussed above with respect to flowchart 250 of FIG. 2.

III. Further Comments and/or Embodiments

In a case in which a plurality of users share an HSM system for big data analysis, some embodiments of the present invention may recognize one, or more, of the following facts, potential problems, and/or potential areas for improvement with respect to the current state of the art: (i) a recall operation may occur in response to a read operation involving a large amount of migrated data (many files, and/or very large files); (ii) the recall operation may result in exclusive use of a storage device (such as a tape drive unit) over an extended time span; (iii) this exclusive use prevents other users from accessing data on the same storage medium (and from using the same storage device); and/or (iv) the completion time of the big data analysis is not predictable, due in part to the unpredictable time needed to recall the data.

For at least the foregoing reasons, conventional HSM systems may assign respective exclusive time-slots to multiple users. Each user, during the user's exclusive time-slot, has exclusive rights to a given tape drive unit. For example, a time table (schedule) may be created to prevent contention and conflict between multiple overlapping migration/recall processes where exclusive access to a given tape cartridge or tape drive is scheduled as follows.

June 16 9:00-June 17 9:00: User-A
June 17 9:00-June 18 9:00: User-B

Assume that User-B wants to perform an analysis operation that requires recall of a file stored on a tape cartridge. In accordance with the time table, User-B waits until June 17 9:00, then moves necessary data to a disk by a bulk-recall operation or the like, and then performs the analysis. Waiting for the exclusive access may cause a considerable delay for User-B in starting the analysis processing.

Some embodiments of the present invention may include one, or more, of the following features, characteristics, and/or advantages: (i) a recall request is receives a low priority value which is time dependent; (ii) the recall operation proceeds at the low priority (meaning it may be performed, intermittently, only when enough resources are available, and only secondarily to any higher priority requests in progress), until a specified time T; (iii) after time T, the priority is updated to high priority. Consequently, because some of the data may be recalled during the low priority period, at high priority time (after time T) the time needed to complete the recall operation (during the high priority period) is reduced, as only the remaining data (data not recalled during the low priority period) remains to be recalled.

Some embodiments of the present invention combine a recall request with a new property for a priority, where the priority changes based on time. By using this new property, for a specific time T, a recall request can be queued with low priority before time T, and it is automatically upgraded to a higher priority after time T. Consequently, a recall request can be partially or fully carried out while having a low priority, and if needed, can be completed once a high priority is obtained.

Embodiments of the present invention introduce a process referred to herein as "scheduled recall". Scheduled recall differs from conventional recall processing (hereinafter referred to as "normal recall"). A scheduled recall request includes the following two attributes: (i) a file path corresponding to a file to be recalled; and (ii) a time-slot reserved for priority use by the scheduled recall request, or in some embodiments, reserved for priority use by a plurality of recall requests associated with a given user. The beginning of such a time-slot is herein referred to as a "start-time", or "threshold time".

Scheduled recall processing may be performed, at least in part, at lower priority than that of normal recall processing until arrival of a time-slot reserved for the scheduled recall request. During the reserved time-slot, the scheduled recall process is carried out with the same priority as for normal recall processing.

Some embodiments of the present invention dynamically vary a priority attribute for a scheduled recall request, increasing the priority attribute during the associated time-slot reserved for the recall request and decreasing the priority attribute after the time-slot has passed.

Figure 4:
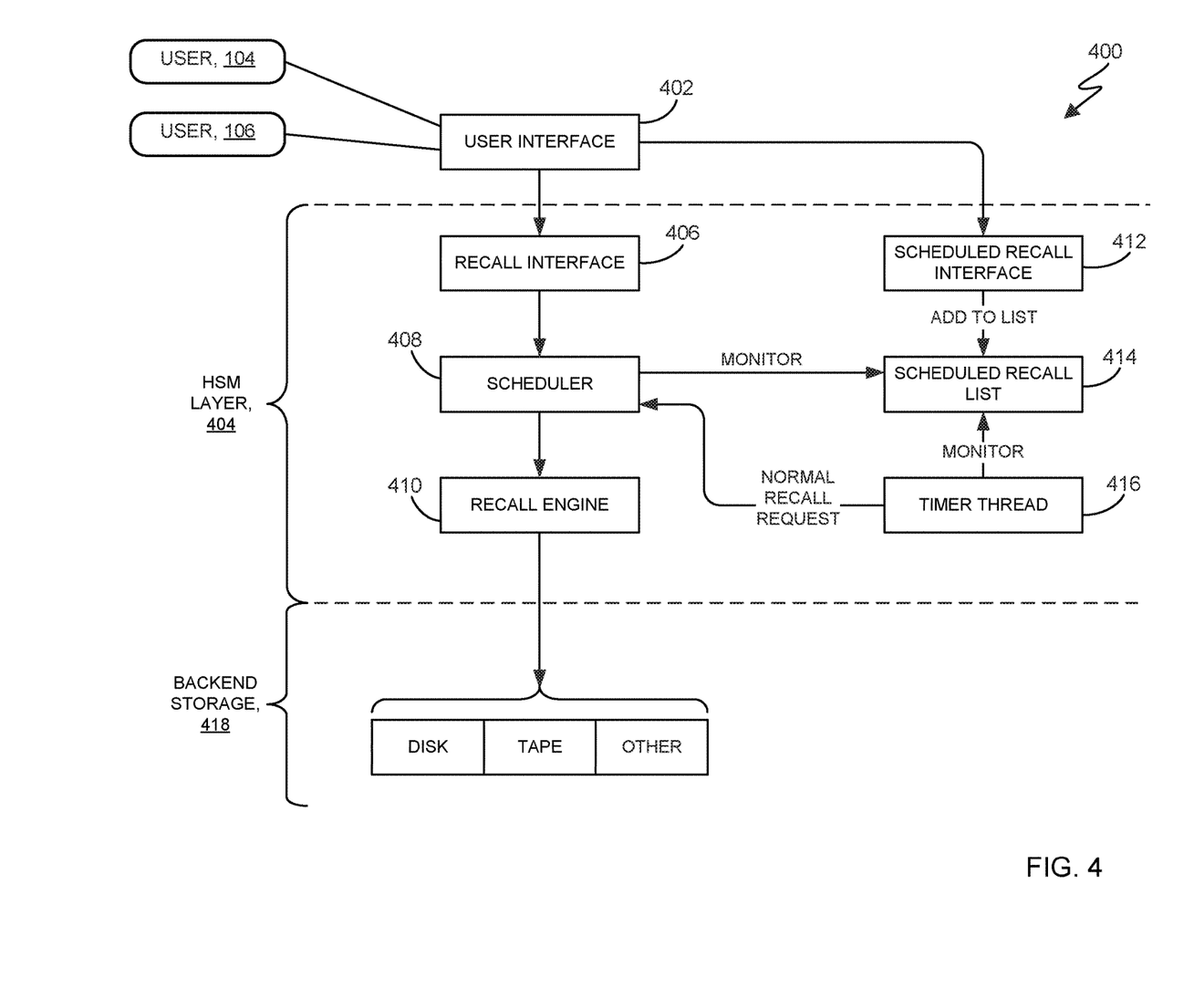
FIG. 4 is a functional block diagram of scheduled recall system in accordance with at least one embodiment of the present invention.

Functional block diagram 400 of FIG. 4 is a shows an HSM storage system configuration, including a scheduled-recall function in accordance with some embodiments of the present invention. The configuration includes: users 104 and 106; user interface 402; HSM layer 404 (comprising: recall interface 406, scheduler 408, recall engine 410, scheduled recall interface 412, scheduled recall list 414, and timer thread 416); and backend storage 418.

Some embodiments of the present invention introduce new components as follows: (i) scheduled recall interface 412 (an interface, such as a representational state transfer application programming interface command (REST API command)), that receives scheduled recall requests from user interface 402; (ii) scheduled recall list 414 (a file that keeps track of scheduled recall requests); and (iii) timer thread 416 (a processing thread for monitoring whether a start-time has been reached). In some embodiments, user interface 402 issues recall requests to recall interface 406 in the case of a normal request, or to scheduled recall interface 412 in the case of a scheduled recall request. In some embodiments, user interface 402 is an interface between a human operator and HSM layer 404. In other embodiments, user interface 402 is an automated interface between a machine component and HSM layer 404. (See definition for "user" in the Definitions sub-section of this Detailed Description section.)

Some embodiments extend the functionality of scheduler 408.

The following few paragraphs provide detailed descriptions of these new components.

Scheduled recall interface 412 receives, from user interface 402, at least a file path or file ID, and a start-time as input parameters. An example scheduled recall API command may be formatted as a REST API command such as:
curl -X POST "http://localhost:8000/scheduled-recall/container/test_file1.data?start_time=201706201400"

The above example API command passes the following information to the API: (i) the file to be recalled by the scheduled recall process—"test_file1.data"; and (ii) the start-time—"2017/06/20 14:00".

Alternatively, a command-line interface for a scheduled recall (srecall) sub-command in some embodiments is formatted as follows:
ltfsee srecall <file-path>/test_file1.data-start_time 201706201400

Where: (i) "ltfsee srecall" is the scheduled recall command in a linear tape file system (LTFS) environment; (ii) "<file-path>/test_file1.data" identifies the data to be recalled; and (iii) "start_time 201706201400" identifies a threshold time after which the scheduled recall request will be handled in a conventional manner.

In some embodiments, the scheduled recall may be configured to recall a plurality of files at once (similar to conventional bulk recall/selective recall processing).

In some embodiments, a request received by scheduled recall interface 412 triggers a request and associated information to be written into scheduled recall list 414. Scheduled recall interface 412 is configured to: (i) receive information pertaining to the file to be processed, and an associated start-time; (ii) get, from a stub file or the like, a tape ID that identifies the tape cartridge on which the file is stored; and (iii) write a combination of a file path, the start-time, and the tape ID into scheduled recall list 414.

In some embodiments, scheduled recall list 414 holds information associated with a plurality of scheduled recall requests, each request of which contains at least the following information: (i) a file path or file ID that identifies the file to be recalled by scheduled recall processing; (ii) a tape ID that identifies the tape cartridge on which the file is stored; and (iii) the start-time.

In some embodiments, scheduled recall list 414 is stored in a text file formatted as comma-separated values (CSV), two examples of which follow:
/container/test_file1.data, TAPE00L7, 201706201400
/container/test_file2.data, TAPE02L7, 201706201500

Some embodiments of the present invention extend the functionality of scheduler 408, and consequently the process by which scheduler 408 passes a normal recall request to recall engine 410. Scheduler 408 performs the following process when passing a normal recall request (NR-req) to the recall engine:

1.) Scheduler 408 defines a parameter T as the tape identifier (tape ID) corresponding to the tape cartridge on which the file(s) requested by the NR-req are stored.

2.) For each scheduled recall entry (SR-entry) in the scheduled recall list:

2.a.) If a file that is targeted by the SR-entry has been migrated, and the tape ID of the SR-entry is the same as the tape ID of the NR-req (tape ID of the SR-entry equals the parameter T) then:

2.a.i.) Scheduler 408 schedules a bulk recall process to recall the file specified in the SR-entry as well as the file(s) requested by NR-req.

After scheduler 408 has performed step 2.a.i., the SR-entry may be removed from the scheduled recall list. However, it is possible under some circumstances, that a file F, that is to be recalled via scheduled recall processing, is independently recalled by the bulk recall processing of step 2.a.i., serves the purpose for which it was recalled, and is then migrated again before the original scheduled start-time associated with file F has been reached. In such a case, scheduler 408 find file F in a migrated state after its associated start-time has passed and is subject to being unnecessarily recalled again, its purpose for recall having already been fulfilled. The following process, performed by some embodiments of the present invention, prevents such a case from occurring:

Scheduled recall for a given file terminates in either of the following two ways: (i) the file is recalled concurrent with a normal recall process (scheduler 408 performs the scheduled recall process in step 2.a.i. above); or (ii) The file is not recalled and the start-time (also sometimes herein referred to as the threshold time) is reached, triggering the recall process to be carried out.

Figure 5A:
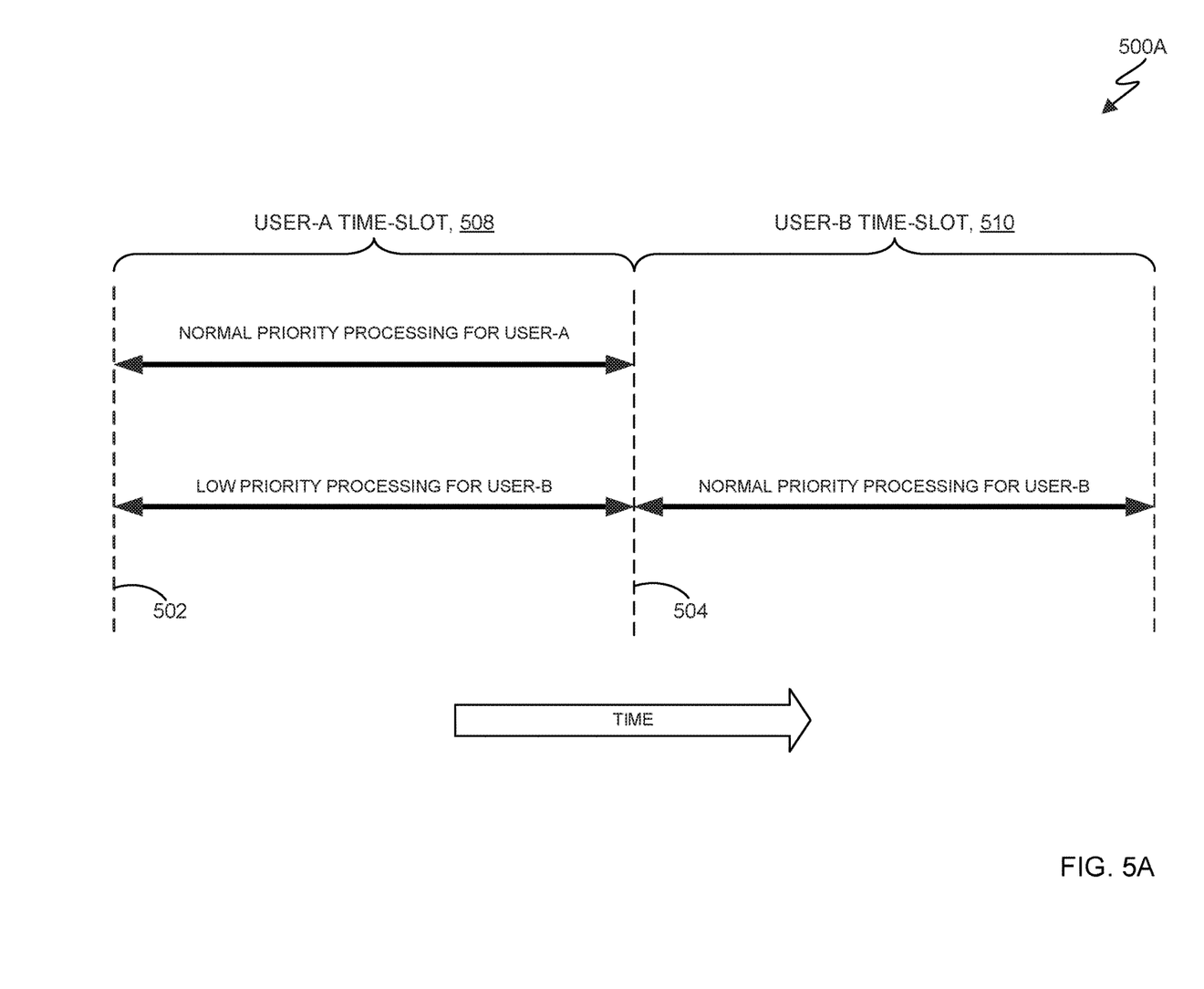
FIG. 5A is a first processing priority timeline in accordance with at least one embodiment of the present invention.

With reference now to timeline 500A of FIG. 5A, for the following discussion, an example time table (schedule), that grants exclusive rights to access a given tape cartridge, is as follows:

User-A time-slot 508—begins at User-A start-time 502 and ends at User-B start-time 504.

User-B time-slot 510—begins at User-B start-time 504.

The start-times of timeline 500A (User-A start-time 502, and User-B start-time 504) may respectively correspond to any moments in time, for example: (i) User-A start-time 502 may correspond to Jun. 16, 2017 at 9:00 am; and (ii) User-B start-time 504 may correspond to Jun. 17, 2017 at 9:00 am.

User-A has normal processing priority during User-A time-slot 508. User-B has normal processing priority during User-B time-slot 510. Concurrent with User-B start-time 504, priority manager sub-module 306 (of scheduler module 304, of HSM program 300, see FIG. 3) automatically transitions priority for processing requests associated with User-B from "low priority" (before User-B start-time 504) to "normal priority" (after User-B start-time 504).

For each file to be recalled by scheduled recall processing, if the file is still in a migrated state (still awaiting recall) after its start-time has passed, the timer thread performs recall processing on the file. More specifically, timer thread 416 performs the following process periodically (for example, every 60 seconds):

1.) For each scheduled recall entry (SR-entry) in the scheduled recall list:

1.a.) If the current time is later than the SR-entry start-time, and the file corresponding to the SR-entry is in a migrated state (has not yet been recalled) then:

1.a.i.) Schedule recall processing for the file as if a normal recall request had been issued.

1.a.ii.) Remove the SR-entry from the scheduled recall list.

With respect to "big data" analysis, a large number of files, having the same start-time, may be listed in the scheduled recall list. To efficiently recall those files, instead of the scheduling at step 1.a.i., some embodiments process those files together using bulk recall processing.

With reference to the preceding time table, in some embodiments of the present invention, User-B performs the following before User-B's reserved time-slot begins:

1.) Creates a list of file paths corresponding to the data that is to be recalled once User-B's reserved time-slot begins.

2.) Makes a request for scheduled recall processing with the file list created in step 1 above, as follows:

2.a.) ltfsee srecall-target-file-list <filelist>-start-time 201706170900

Based on the above operations, recall operations performed by User-A recall the files requested by User-A as well as the files for which the scheduled recall processing has been requested by User-B and which are stored in the same tape as are the files requested by User-A, before 9:00 on June 17. At 9:00 on June 17, the reserved time-slot for User-B starts. The HSM system automatically recalls the files remaining on the tape during User-B's reserved time-slot. User-B may then start his/her original processing during his/her reserved time-slot and the remaining files will be recalled.

Figure 5B:
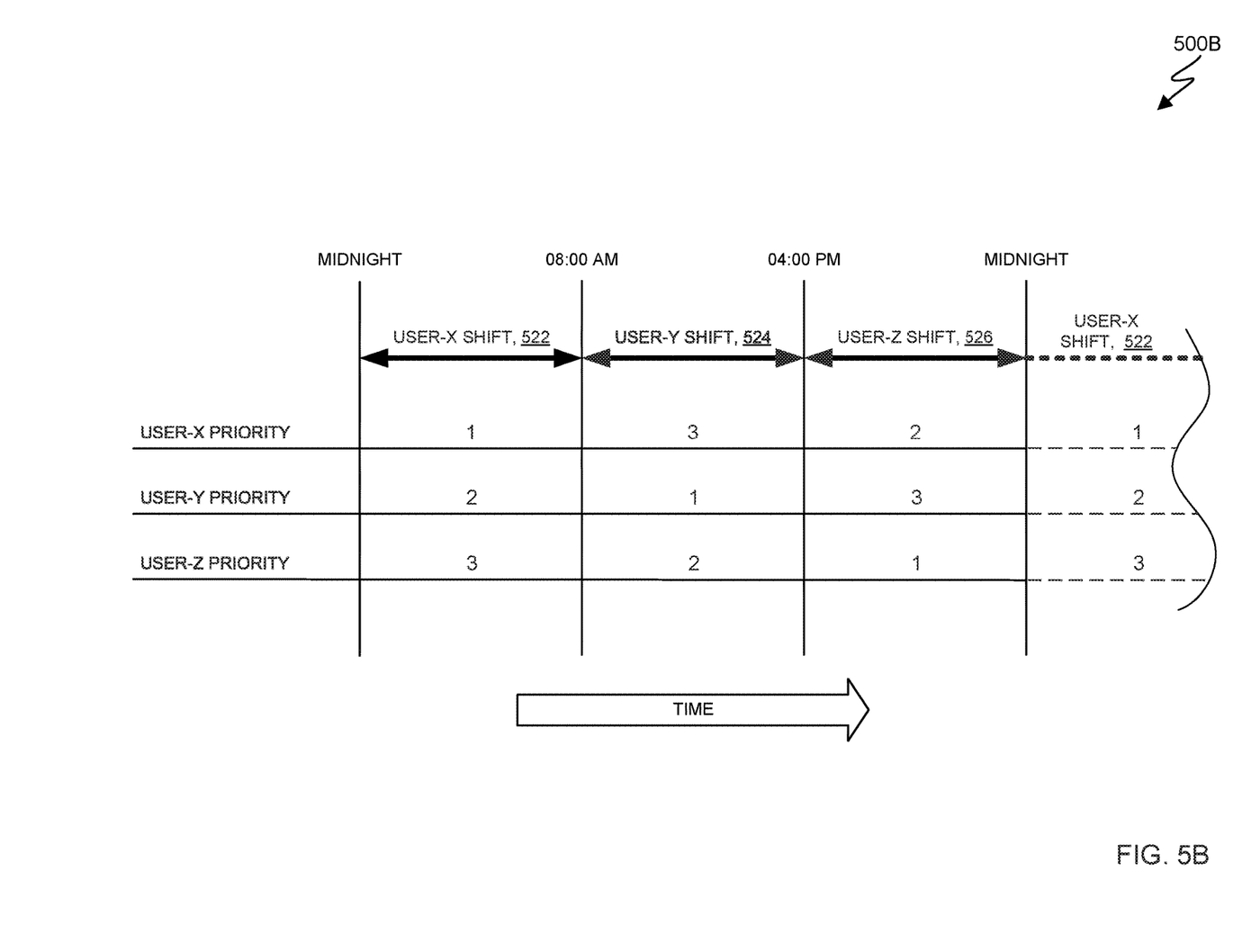
FIG. 5B is a second processing priority timeline in accordance with at least one embodiment of the present invention.

For simplicity of discussion herein, the priority attribute takes one of two values: low and high, and only one start-time is specified. However, the number of values the priority attribute can take may be more than two, and two or more respectively corresponding start-times may be specified. For example, timeline 500B of FIG. 5B shows three users, User-X, User-Y, and User-Z, each of whom is allocated an 8-hour reserved time-slot based respectively on their scheduled working shifts: User-X works the midnight to 08:00 am shift and is consequently allocated a time-slot starting at midnight (User-X's start-time (threshold time)) and running to 08:00 am; User-Y works from 08:00 am to 04:00 pm, and is consequently allocated a time-slot during these hours; and User-Z works 04:00 pm to midnight and is consequently allocated a time-slot starting at 04:00 pm (User-Z's start-time (threshold time)) and running to midnight. During User-X shift 522, User-X has the highest priority (1), User-Y has a lower priority (2), and User-Z has the lowest priority (3) with respect to processing recall requests. During User-Y shift 524, the priorities for Users X, Y, and Z are respectively 3, 1, and 2. During User-Z shift 526, the priorities for Users X, Y, and Z are respectively 2, 3, and 1. In the embodiment of FIG. 5B, the priority allocations repeat each day, with User-X shift 522 starting again at midnight.

In some embodiments of the present invention, a user's priority gets higher as time approaches the user's reserved time-slot, a practice which helps to maximize all users' productivity without having a negative impact on recall requests associated with other users. Referring again to timeline 500B, as the time approaches closer to a user's start-time, priority manager sub-module 306 (see FIG. 3) bumps up the user's priority to a higher level. For example, User-X shift 522 (between the hours of midnight and 08:00 am), there are between 16 and 8 hours before the start-time for User-Z—consequently, User-Z has the lowest priority (3) during User-X shift 522. Beginning at 08:00 am, priority manager sub-module 306 upgrades User-Z's priority to a mid-level value (2)—during User-Y shift 524, there are, at most, 8 hours before user-Z's start-time. At 04:00 pm, User-Z's start-time has arrived, and priority manager sub-module 306 bumps User-Z's priority to the highest level (1). Priority manager sub-module 306 manages the priorities of Users X and Y in the same fashion, as illustrated in FIG. 500B. At each start-time, the priority assigned to the user whose time-slot expired is bumped down to the lowest priority, after which it climbs back up as the user's next assigned time-slot approaches anew.

Some embodiments of the present invention place a restriction on the number of entries in the scheduled recall list. If User-X is given priority for recall operations, and User-Y has a large number of files (and/or a large amount of data) that can be recalled during User-X's recall time, User-Y's activity could have a negative impact on the recall performance for User-X. The restriction on the number of entries in the scheduled recall list is intended to prevent such an adverse impact on the priority user (User-X in this example).

In some embodiments of the present invention, a method performs recall processing, in a hierarchical storage management (HSM) system used by a plurality of users, where the HSM system has a higher tier of higher-speed, smaller-capacity storage and a lower tier of lower-speed, largecapacity storage. The method for recalling a plurality of data units stored in the lower tier to the higher tier, comprises: (i) assigning a time-variable recall priority to each recall request; (ii) performing recall processing, of the plurality of data units, in a sequential manner, in accordance with the respective assigned time-variable recall priorities; (iii) each time-variable recall priority includes a first priority for a first time-slot and a second priority for a second time-slot, the second priority representing a higher priority than the first priority; (iv) the first time-slot is assigned to a first user, and the second time-slot is assigned to a second user; (v) the method identifies the first time-slot and the second time-slot based on a start-time specified by the second user, where the start-time indicates when the corresponding recall process is to be started; (vi) the method identifies at least some of the plurality of data units to be recalled based on a file path specified by the second user; (vii) the method generates a scheduled recall request list containing information indicative of the identified data units and the start-time; (viii) the method immediately passes a normal recall request in a case where the time-variable recall priority is not assigned to a recall scheduler; (ix) the method performed by the recall scheduler comprises: (a) in response to receiving a normal recall request, identifies a storage medium where the data units targeted by the normal recall request are stored, (b) identifies scheduled recall requests contained in the scheduled recall request list and requests recall processing on data units stored in the identified storage medium, and (c) while the identified storage medium is mounted, performs recall processing for the normal recall request and the identified scheduled recall requests; and (x) in response to the second time-slot being started, performs bulk recall processing for recall requests remaining in the scheduled recall request list.

It is to be understood that while much of the description herein focuses on processing recall requests in a hierarchical storage management system, some embodiments of the present invention can be applied to any requests for data access on any level of a hierarchical storage management system. Requests for access to data include not only recall requests, but read requests, write requests, migration requests, or any other process where data is to be moved and/or copied from one storage device to another, including data transfer between: (i) one level of an HSM to another level; (ii) one computer memory and/or storage device to another computer memory and/or storage device.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for processing recall requests in a hierarchical storage management system, the method comprising:
receiving, via a scheduled recall interface, a plurality of recall requests, including a first recall request, wherein:
the first recall request is for at least a subset of a plurality of data units to be recalled from a second layer of the hierarchical storage management system to a first layer of the hierarchical storage management system, and the first recall request is associated with a first time-slot;

assigning a respectively corresponding time-variable recall priority to the first recall request; and copying, in a sequential manner, from the second layer to the first layer, the at least a subset of the plurality of data units respectively corresponding to the plurality of recall requests, based at least in part on the respectively corresponding time-variable recall priority;

wherein the scheduled recall interface receives recall requests that include respectively corresponding start times.

2. The method of claim 1, wherein the time-variable recall priority has a first priority corresponding to any time outside of the first time-slot, and a second priority corresponding to any time within the first time-slot, the second priority representing a higher priority than the first priority.

3. The method of claim 2, further comprising:
assigning the first time-slot to a first user; and
assigning a second time-slot to a second user wherein the second user requests recall of the at least a subset of the plurality of data units to be recalled.

4. The method of claim 3, wherein the first time-slot and the second time-slot are based, at least in part, on a threshold time specified by the second user, the threshold time being indicative of a time after which recall processing is to be started.

5. The method of claim 4, wherein the at least the subset of the plurality of data units to be recalled are identified, based at least in part on at least one file path specified by the second user.

6. The method of claim 5, further comprising:
generating a scheduled recall request list containing information indicative of the identified data units and the threshold time.

7. The method of claim 6, further comprising:
scheduling a second recall request to which the time-variable recall priority is not assigned.

8. The method of claim 7, further comprising:
in response to receiving the second recall request, identifying a first target storage medium on which a first data unit requested by the second recall request is stored;
determining a scheduled recall request list contains information indicative of the identified data units and the threshold time;
identifying a second target storage medium on which a second data unit requested by a scheduled recall request listed in the scheduled recall request list is stored;
determining that the first target storage medium and the second target storage medium are a single common target storage medium;
requesting recall processing on the first and second data units stored in the common target storage medium; and
while the common target storage medium is mounted in a drive unit, performing recall processing for the second recall request and the scheduled recall request.

9. The method of claim 6, further comprising:
in response to the second time-slot being started, performing a recall process for recall requests remaining listed in the scheduled recall request list.

10. A computer program product for processing recall requests in a hierarchical storage management system, the computer program product comprising a computer readable storage medium having stored thereon program instructions programmed to perform:
receiving, via a scheduled recall interface, a plurality of recall requests, including a first recall request, wherein:
the first recall request is for at least a subset of a plurality of data units to be recalled from a second layer of the hierarchical storage management system to a first layer of the hierarchical storage management system, and
the first recall request is associated with a first time-slot;
assigning a respectively corresponding time-variable recall priority to the first recall request; and
copying, in a sequential manner, from the second layer to the first layer, the at least a subset of the plurality of data units respectively corresponding to the plurality of recall requests, based at least in part on the respectively corresponding time-variable recall priority;
wherein the scheduled recall interface receives recall requests that include respectively corresponding start times.

11. The computer program product of claim 10, wherein the time-variable recall priority has a first priority corresponding to any time outside of the first time-slot, and a second priority corresponding to any time within the first time-slot, the second priority representing a higher priority than the first priority.

12. The computer program product of claim 11, further comprising program instructions programmed to perform:
assigning the first time-slot to a first user; and
assigning a second time-slot to a second user wherein the second user requests recall of the at least a subset of the plurality of data units to be recalled.

13. The computer program product of claim 12, wherein the first time-slot and the second time-slot are based, at least in part, on a threshold time specified by the second user, the threshold time being indicative of a time after which recall processing is to be started.

14. The computer program product of claim 13, wherein the at least the subset of the plurality of data units to be recalled are identified, based at least in part on at least one file path specified by the second user.

15. The computer program product of claim 14, further comprising program instructions programmed to perform:
generating a scheduled recall request list containing information indicative of the identified data units and the threshold time.

16. The computer program product of claim 15, further comprising program instructions programmed to perform:
scheduling a recall request to which the time-variable recall priority is not assigned.

17. The computer program product of claim 16, further comprising program instructions programmed to perform:
in response to receiving the recall request, identifying a first target storage medium on which a first data unit requested by the recall request is stored;
determining a scheduled recall request list contains information indicative of the identified data units and the threshold time;
identifying a second target storage medium on which a second data unit requested by a scheduled recall request listed in the scheduled recall request list is stored;
determining that the first target storage medium and the second target storage medium are a single common target storage medium;

requesting recall processing on the first and second data units stored in the common target storage medium; and while the common target storage medium is mounted in a drive unit, performing recall processing for the recall request and the scheduled recall request.

18. The computer program product of claim 15, further comprising program instructions programmed to perform:

in response to the second time-slot being started, performing a recall process for recall requests remaining listed in the scheduled recall request list.

19. A computer system for processing recall requests in a hierarchical storage management system, the computer system comprising:

a processor set; and a computer readable storage medium;

wherein:

the processor set is structured, located, connected and/or programmed to run program instructions stored on the computer readable storage medium; and the program instructions include program instructions programmed to perform:

receiving, via a scheduled recall interface, a plurality of recall requests, including a first recall request, wherein;

the first recall request is for at least a subset of a plurality of data units to be recalled from a second layer of the hierarchical storage management system to a first layer of the hierarchical storage management system, and the first recall request is associated with a first time-sot;

assigning a respectively corresponding time-variable recall priority to the first recall request; and copying, in a sequential manner, from the second layer to the first layer, the at least a subset of the plurality of data units respectively corresponding to the plurality of recall requests, based at least in part on the respectively corresponding time-variable recall priority;

wherein the scheduled recall interface receives recall requests that include respectively corresponding start times.

20. The computer system of claim 19, wherein the time-variable recall priority has a first priority corresponding to any time outside of the first time-slot, and a second priority corresponding to any time within the first time-slot, the second priority representing a higher priority than the first priority.

* * * * *